US008338515B1

(12) United States Patent
Parr et al.

(10) Patent No.: US 8,338,515 B1
(45) Date of Patent: *Dec. 25, 2012

(54) SILICONE-MODIFIED TACKIFIER AND USE THEREOF IN PRESSURE SENSITIVE ADHESIVE COMPOSITIONS AND LAMINATES WITH IMPROVED GUILLOTINABILITY

(75) Inventors: Rebecca A. Parr, Troy, OH (US); David P. Allen, Bridgeport, WV (US); Daniel P. Ratka, Grafton, WV (US); Earl G. Melby, Morgantown, WV (US); Frank D. Miller, Mount Clare, WV (US); Thomas W. Bansback, Granger, IN (US)

(73) Assignee: DT-SP IP Holding LLC, Troy, OH (US)

( * ) Notice: Subject to any disclaimer, the term of this patent is extended or adjusted under 35 U.S.C. 154(b) by 562 days.

This patent is subject to a terminal disclaimer.

(21) Appl. No.: 12/466,168

(22) Filed: May 14, 2009

(51) Int. Cl.
 *C09D 11/10* (2006.01)
(52) U.S. Cl. ...... 524/272; 428/40.1; 428/42.3; 428/447; 524/270
(58) Field of Classification Search .............. 428/40.1, 428/42.3, 447; 524/270, 272
 See application file for complete search history.

(56) References Cited

U.S. PATENT DOCUMENTS

| | | | |
|---|---|---|---|
| 4,151,319 A | 4/1979 | Sackoff et al. | |
| 4,346,189 A | 8/1982 | Laurent | |
| 4,507,429 A | 3/1985 | Lenney | |
| 4,548,845 A | 10/1985 | Parsons et al. | |
| 4,699,938 A | 10/1987 | Minamizaki et al. | |
| 4,725,639 A | 2/1988 | Lenney | |
| 4,994,538 A | 2/1991 | Lee | |
| 5,154,974 A | 10/1992 | Norman et al. | |
| 5,164,444 A | 11/1992 | Bernard | |
| 5,189,126 A | 2/1993 | Bernard | |
| 5,234,736 A | 8/1993 | Lee | |
| 5,237,082 A | 8/1993 | Leir et al. | |
| 5,264,532 A | 11/1993 | Bernard | |
| 5,278,227 A | 1/1994 | Bernard | |
| 5,317,055 A * | 5/1994 | Yang ............................ 524/458 |
| 5,322,876 A | 6/1994 | Sasaki et al. | |
| 5,508,360 A | 4/1996 | Cifuentes et al. | |
| 5,631,082 A | 5/1997 | Hirose et al. | |
| 5,705,551 A | 1/1998 | Sasaki et al. | |
| 5,895,801 A | 4/1999 | Lee | |
| 5,916,981 A | 6/1999 | Cifuentes et al. | |
| 5,939,479 A | 8/1999 | Reaves et al. | |
| 6,007,914 A | 12/1999 | Joseph et al. | |
| 6,242,552 B1 | 6/2001 | Su | |
| 6,306,982 B1 | 10/2001 | Lee et al. | |
| 6,416,858 B1 | 7/2002 | Ercillo et al. | |
| 6,417,267 B1 | 7/2002 | Stockl et al. | |
| 6,423,392 B1 | 7/2002 | Koch et al. | |
| 6,545,086 B1 | 4/2003 | Kosal | |
| 6,547,887 B1 | 4/2003 | Ko et al. | |
| 6,579,941 B1 | 6/2003 | Sasaki et al. | |
| 6,586,510 B1 | 7/2003 | Brown et al. | |
| 6,730,397 B2 | 5/2004 | Melancon et al. | |
| 6,730,737 B1 | 5/2004 | De Keyzer et al. | |
| 7,012,110 B2 | 3/2006 | Sherman et al. | |
| 7,253,238 B2 | 8/2007 | Griswold et al. | |
| 2003/0175510 A1 | 9/2003 | Sherman et al. | |
| 2005/0282024 A1 | 12/2005 | Sherman et al. | |
| 2006/0159915 A1 | 7/2006 | Chang et al. | |
| 2007/0059535 A1 | 3/2007 | Nakamura | |
| 2007/0231571 A1 | 10/2007 | Lane et al. | |

FOREIGN PATENT DOCUMENTS

| | | |
|---|---|---|
| EP | 197774 A2 | 10/1986 |
| EP | 735103 A2 | 10/1996 |
| JP | 62039646 A * | 2/1987 |
| JP | 2001011419 A | 6/1999 |
| WO | 9310177 A1 | 5/1993 |
| WO | 03052019 A1 | 6/2003 |

* cited by examiner

*Primary Examiner* — David W Wu
*Assistant Examiner* — Marie Reddick
(74) *Attorney, Agent, or Firm* — Pearne & Gordon LLP

(57) ABSTRACT

A pressure sensitive adhesive composition including silicone-modified tackifier. The silicone-modified tackifier is produced by reacting reactive silicone with tackifier. Laminates made with the pressure sensitive adhesive have improved guillotinability.

28 Claims, No Drawings

SILICONE-MODIFIED TACKIFIER AND USE THEREOF IN PRESSURE SENSITIVE ADHESIVE COMPOSITIONS AND LAMINATES WITH IMPROVED GUILLOTINABILITY

FIELD OF THE INVENTION

The present invention relates to adhesive compositions and, in particular, to pressure sensitive adhesive compositions having silicone-modified tackifier. The compositions provide improved guillotinability.

BACKGROUND OF THE INVENTION

Pressure sensitive adhesive (PSA) laminates include a supporting web or face sheet, a release liner with a silicone release layer and a pressure sensitive adhesive layer in between them. Some processes for forming labels and other adhesive products cut a plurality of stacked PSA laminates with a knife blade referred to as a guillotine. Although the PSA has been dried, during the cutting operation the adhesive may flow when pressure is applied by the guillotine, smearing the adhesive onto the knife blade and along the sides of the laminate stack. This makes the laminates difficult to separate and results in cutting of fewer laminates with the guillotine. Another problem is the formation of balls of adhesive (referred to as glue balls) on the sides of the laminates, which leads to aesthetic and functional problems; for example, the laminate sheets with adhesive on the edge can jam or deposit adhesive in a printing press, paper-feeder or copy machine. Also, the knife blade, press equipment or copy equipment has to be cleaned at shorter intervals than is desirable.

Acrylic polymer-based pressure sensitive adhesives are known to provide good adhesion to a variety of substrates and good outdoor durability. The adhesives are permanent in that once they are applied to a substrate they cannot be removed without damaging the label or the substrate. This makes acrylic pressure sensitive adhesives suitable for shipping labels and the like.

Some attempts have been made to use silicone compounds in adhesive compositions. For example, one disclosure described silicone acrylate polymer in an adhesive composition. Another disclosure described an acrylic latex emulsion mixed with an emulsion of a nonreactive silicone compound in the formation of an adhesive composition. The contents of U.S. Pat. Nos. 5,154,974 and 4,346,189 are incorporated herein by reference.

Despite attempts to use silicone in adhesive compositions, there remains a need for a pressure sensitive adhesive composition for use in laminates having improved guillotinability while achieving good tack and adhesion to substrates that are difficult to adhere to and that can be easily cleaned from the knife blade.

SUMMARY OF THE INVENTION

A silicone-modified tackifier is provided, which is the reaction product of reactive silicone reacted with first tackifier. A pressure sensitive adhesive composition is provided, which comprises, based on solids, 5-90 weight percent of the invented silicone-modified tackifier. A PSA laminate is provided, which comprises a release liner, a face sheet, and a layer of the invented PSA therebetween. A method of preparing a silicone-modified tackifier is also provided.

DETAILED DESCRIPTION OF THE PREFERRED EMBODIMENTS OF THE INVENTION

In the description that follows, when a preferred range, such as 5 to 25 (or 5-25), is given, this means preferably at least 5 and, separately and independently, preferably not more than 25. Unless otherwise indicated, all parts are parts by weight and all percents are weight percents, both herein and in the appended claims. Based on solids, and total solids, means without considering the water.

The invented silicone-modified tackifier is preferably prepared in a silicone-modified tackifier emulsion as per the preferred formulations shown in Table 1. In the formulations or tables of components herein, any preferred or less preferred weight percent or weight percent range of any component can be combined with any preferred or less preferred weight percent or weight percent range of any of the other components; it is not required or necessary that all or any of the weight percents or weight percent ranges come from the same column.

TABLE 1

Preferred compositions of silicone-modified tackifier emulsion (listed in weight percents)

| Component | Preferred | Less Preferred | Still Less Preferred |
|---|---|---|---|
| Tackifier | 43-48 | 40-50 | 25-70 |
| | | 33-60 | |
| Reactive Silicone | 6.3-8 | 5-10 | 1-15 |
| | | 3-13 | |
| Surfactant | 4-7 | 2-8 | 1-10 |
| | | | 0.5-14 |
| Water | 30-50 | 20-60 | 10-73 |

Preferred ratios of tackifier to reactive silicone can be seen from Table 1, that is (in parts by weight): 25-70 parts tackifier to 1-15 parts reactive silicone; more preferably 33-60 parts tackifier to 3-13 parts reactive silicone; more preferably 40-50 parts tackifier to 5-10 parts reactive silicone, more preferably 43-48 parts tackifier to 6.3-8 parts reactive silicone.

Preferred ratios (in parts by weight) of tackifier to reactive silicone can also be 6.7 to 1 or 6-7 to 1 or 5-8 to 1 or 4-9 to 1 or 3-10 to 1 or 2-12 to 1 or 1.5-20 to 1.

As used herein, tackifier means a tackifier as understood by those of ordinary skill in the art of adhesives compounding and by those of ordinary skill in the art of rubber compounding and includes all the tackifiers identified herein and all the tackifiers listed as such in the Blue Book 1997, published by Rubber World magazine, 1867 West Market Street, Akron Ohio 44313, copyright 1997 by Lippincott & Peto Inc. and also in subsequent editions of the Blue Book 1997.

As used herein, tackifier, such as first tackifier, can be a single tackifier or a blend or mixture of a plurality of tackifiers. Preferred tackifiers are low molecular weight resins that are compatible with polymer latexes and which provide improved tack and peel properties. Preferred tackifiers include the Escorez tackifiers from Exxon Chemical, particularly Escorez 2520 (aromatic modified aliphatic resin); the Norsolene tackifiers from Cray Valley, particularly Norsolene S115 (aromatic resin); and the Wingtack tackifiers from Cray Valley, particularly Wingtack 86 (aromatic modified aliphatic resin). Preferred tackifiers include rosin esters, which can be formed by reacting rosin with an alcohol (preferably, one of pentaerythritol, glycerol, and a glycol). Preferred tackifiers can be formed by copolymerizing an aliphatic monomer (preferably selected from the group consisting of piperylene, isoprene, dicyclopentadiene, 2-methylbutene and combinations thereof) with an aromatic monomer (preferably selected from the group consisting of vinyl toluene, styrene, alpha methyl styrene, indene and combinations thereof); these tackifiers can be substituted or unsubstituted. Preferred tackifiers can be formed by polymerizing an aromatic monomer, preferably selected from the group consisting of vinyl toluene, styrene, alpha methyl styrene, indene and combinations thereof. Preferred tackifiers are C9 and C5/C9 tackifiers, such as the Norsolene tackifiers. Preferred tackifiers are those which are aromatic modified aliphatic resins, preferably with aromatic content of 20-30 or 20-40 or 10-50 wt. %, or aromatic resins or 100% aromatic resins.

Preferred tackifiers include those which react well with the reactive silicone, for example, when the reactive silicone is silanol terminated poly (dimethyl siloxane), the tackifier preferably has aliphatic portions having carbon-carbon double bonds. The reactive silicone preferably reacts with the tackifier by covalently bonding to the tackifier. As noted, the tackifier may be a mixture of a plurality of tackifiers; for example, one of the tackifiers in the mixture may be selected because it reacts well with the reactive silicone, a second of the tackifiers in the mixture may be selected to adjust the ring and ball softening point, a third of the tackifiers in the mixture may be selected to adjust the aromatic content. Alternatively, one or more of the tackifiers in the mixture may be selected to adjust adhesion characteristics or adhesion to different substrates, adjust the operating temperature of the adhesive, adjust tack characteristics, improve weatherability, adjust coatability, adjust rheology and/or improve compatibility with other components.

Less preferred tackifiers are rosin tackifiers, C5 aliphatic resin tackifiers, and coumarone-indene resins. Less preferred tackifiers can be formed by polymerizing terpenes like alpha pinene, beta pinene and limonene or combinations thereof.

The tackifier used in the present invention (which can be a single tackifier or a blend or mixture of a plurality of tackifiers) preferably has a ring and ball softening point of 10-120, more preferably 25-110, more preferably 40-100, more preferably 50-90, more preferably 60-80, more preferably 65-75, more preferably 68-72, more preferably about 70, ° C. The tackifier preferably has an aromatic content of 5-60, more preferably 10-50, more preferably 20-40 or 20-30, weight percent.

The reactive silicone preferably has a reactive silanol group or other reactive group and is preferably an amino modified silicone oil, an epoxy modified silicone oil, a carboxylic acid modified silicone oil or, more preferably, a silanol modified silicone oil. The silicone oil which is modified is preferably poly (dimethyl siloxane), less preferably other siloxane polymers. The reactive silicone is preferably Prod. SM2138 from Momentive Performance Materials, less preferably other silanol terminated poly (dimethyl siloxane) polymers, the reactive silicone preferably having a number average molecular weight of about 2000-300,000, more preferably 5000-200,000, more preferably 8000-160,000, more preferably 10,000-120,000, more preferably 20,000-75,000, more preferably 30,000-50,000, more preferably 35,000-45,000, more preferably about 40,000, preferably with a general formula:

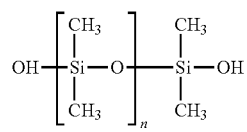

Care should be taken to avoid a reaction of the reactive silicone with the release coating on the release liner. The release liner is usually coated with a poly (dimethyl siloxane) release coat, preferably a radiation cured poly (dimethyl siloxane) or thermal cured poly (dimethyl siloxane), more preferably rhodium or tin cured thermal poly (dimethyl siloxane), or more preferably a platinum cure poly (dimethyl siloxane) with the general formula:

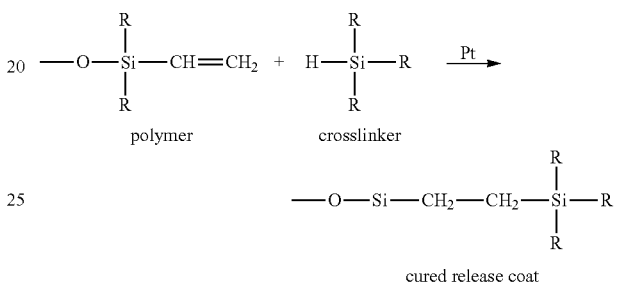

The release value is measured by the force required to remove the release liner from the adhesive. Stable release values are important so that the finished coated product is stable over a shelf life of several years. If the reactive silicone in the adhesive is not completely reacted with and bonded to the tackifier, the residual reactive silicone may react with fugitive polymer, crosslinker, or metal in the release coat; the release coat and adhesive may bond together over time. The result is higher release values over time or in extreme cases "lock up" where the release liner cannot be removed without destruction of the liner or label. Accordingly, care should be taken to react all of the reactive silicone with tackifier. Less preferably you may switch to a non-silicone release liner, such as carbamate, polyethylene, acrylate, polyvinyl acetate/acrylate, and modified polyurethane.

The purpose of the surfactant is to emulsify the silicone-modified tackifier particles in the water. The surfactant is preferably an anionic surfactant, preferably potassium rosinate formed by the reaction of rosin with potassium hydroxide (for example, 5 wt. % KOH and 95 wt. % rosin); the rosin is preferably abietic acid and/or isomers of abietic acid, preferably Staybelite from Hercules Chemical. (NaOH or NH₄OH can be used for the KOH). Less preferred anionic surfactants are potassium oleate or other fatty acids reacted with KOH. The ratio (in parts by weight) of reactive silicone to anionic surfactant is preferably 1.64 to 1 or 1.5-1.7 to 1 or 1.4-1.8 to 1 or 1-2 to 1.

The surfactant can be anionic surfactant, non-ionic surfactant, or a combination of the two. The surfactant can include non-ionic surfactant, such as ethoxylated nonyl phenol that contains 10 mol % of ethylene oxide. Less preferred surfactants are ethoxylated nonyl phenols, ethoxylated octyl phenols, linear alcohol ethoxylates, branched alcohol ethoxylates, castor oil ethoxylates, alkylamine ethoxylates, ethoxylated alkanolamides, ethylene oxide propylene oxide block copolymers, sorbitol ester ethoxylates, stearic acid ethoxylates and tall oil fatty acid ethoxylates. The ratio (in parts by weight) of anionic surfactant to non-ionic surfactant in the surfactant can be, for example, 2 to 1 or 2.2-1.8 to 1 or 3-1 to 1.

The silicone-modified tackifier is preferably prepared in an emulsion, preferably as follows. The tackifier, such as first tackifier, is mixed and melted above 100° C. (preferably about 120° C.). Once melted, the tackifier is cooled to 95° C. and the surfactant and the reactive silicone are added to the melted tackifier and mixed thoroughly for about 15 minutes. At this stage the reactive silicone reacts with the molten tackifier forming silicone-modified tackifier. The entire mixture is then slowly agitated while hot water (95° C.) is added in increments every 2-3 minutes. Initially, the melt is the continuous phase with droplets of water dispersed throughout the melt (W/O emulsion). After about 20% of the total water is added, the mixture undergoes phase inversion whereby small particles of the silicone-modified tackifier are dispersed in the continuous water phase (O/W emulsion). Additional water is then added in increments every 2-3 minutes until the desired % solids are obtained. The resultant product is an oil-in-water type emulsion of particles in water.

The invented pressure sensitive adhesive (PSA) composition has the preferred formulations shown in Table 2 (listed in percents by weight without the water, if any; this is also known as percent by weight based on solids). Please note that the amount of anti-foaming agent, wetting agent and thickener may be varied so as to be appropriate for the specific coater and release liner used.

TABLE 2

| Component | Preferred | Less Preferred | Still Less Preferred |
|---|---|---|---|
| Silicone-Modified Tackifier | 38-42 | 30-50<br>20-65 | 10-80<br>5-90 |
| Polymer Latex | 56-60 | 47-68<br>32-77 | 17-90<br>9-90 |
| Anti-Foaming Agent | 0.2-0.65 | 0.1-2 | 0-4 |
| Wetting Agent | 0.5-1.3 | 0.2-2.5 | 0.1-5<br>0.05-12 |
| Thickener | 1-1.5 | 0.5-2 | 0-4 |

The silicone-modified tackifier is the silicone-modified tackifier particles in the silicone-modified tackifier emulsion described above.

The polymer latex is preferably acrylic latex (preferably poly-2-ethylhexyl acrylate, preferably having a number average molecular weight range of 75,000-95,000, the latex preferably having an acid number of about 3.8-4.0 or about 3.9), less preferably natural rubber latex, nitrile latex, polychloroprene latex, styrene-butadiene latex, carboxylated styrene butadiene latex, vinyl pyridine latex, polybutadiene latex, and combinations thereof.

Alternatively the polymer latex can be made from polymers or copolymers of these monomers: butyl acrylate, propyl acrylate, octyl acrylate, ethyl acrylate, methyl acrylate, styrene, vinyl acetate, acrylic acid, methacrylic acid, 2-hydroxyethyl acrylate, 2-hydroxypropyl acrylate, 2-hydroxyethyl methacrylate.

The anti-foaming agent is added to reduce the tendency to foam. Preferred anti-foaming agents are hydrocarbon oils and silicone oils. In some cases, particulate silica can be added to a silicone oil anti-foam agent. The anti-foaming agent is preferably a polyglycol ester such as Surfynol DF75 from Air Products, or a product such as Foamaster 111 (oil-based proprietary defoamer) from Cognis Corp., or an oil-based or silicone oil anti-foaming agent as known in the art.

The wetting agent is to help the PSA wet out on the silicone-coated release liner; the wetting agent is preferably a non-ionic or anionic/nonionic surfactant, such as Dapro W-77 docusate sodium from Elementis Specialties. Alternatively the wetting agent can be ethoxylated nonyl phenols, dioctyl sulfosuccinate, ethoxylated alcohols and, more preferably, acetylenic diols. The polymer latex obtained from a supplier may already have a suitable wetting agent added.

The thickener is optional and is added as needed to achieve the desired viscosity and is preferably an associative urethane, such as DSX1550 from Nopco Corp.

The invented silicone-modified tackifier emulsion and the invented pressure sensitive adhesive composition can also have other conventional additives in conventional amounts, such as viscosity adjusters, bulking agents, other wetting agents, other surfactants, and other anti-foaming agents.

The PSA composition is preferably made at room temperature as follows. The silicone-modified tackifier emulsion described above (see Table 1) is provided in a blend tank with good agitation and allowed to cool to room temperature. The polymer latex, anti-foaming agent, wetting agent, thickener and any other additives, are then added; all ingredients are blended thoroughly, water is added as needed, and then the material is filtered. The final composition has total solids of preferably 30-70 or 40-66 or 50-62 or 53-58 or about 56, percent.

The invention can also be provided in a solvent-based environment rather than a water-based environment. For example, take the tackifier and reactive silicone as per Table 1 and in the Table 1 proportions (omit the surfactant); melt the tackifier, blend in the reactive silicone and let it react with the tackifier to form the silicone-modified tackifier. Let it cool; add the solvent, such as toluene, methyl ethyl ketone, acetone, xylene, VM & P naphtha, etc.; and dissolve or suspend the silicone-modified tackifier in the solvent. To make the pressure sensitive adhesive, take one or more of the polymers described in Table 2, such as an acrylic polymer, and dissolve it in one of the solvents mentioned above, such as toluene or MEK. To this you then add the solvent containing the silicone-modified tackifier. Most of these solvents are organic and are miscible; for example, you can mix (a) silicone-modified tackifier in toluene with (b) acrylic polymer in MEK.

The invented PSA composition is used in laminates, preferably in any application where a PSA laminate is guillotined, and is also useful in any PSA laminate where adhesive on the edge of a sheet may cause a processing problem or paper jam, for example, where sheets are slit, cut, die-cut, or run through a fax machine, copy machine, printer, scanner, paper feeder, etc.

The invented PSA composition is used to make a PSA laminate in a conventional manner, that is, the PSA is coated onto a conventional silicone-coated release liner, which is then laminated to face stock or face sheet, which is conventional paper or film as known in the art.

Laminates, such as label paper, assembled using this adhesive can be used for a broad range of consumer and industrial uses, including as labels, fasteners, and tapes. These laminates can be printed with information using print methods including, but not limited to, offset, flexographic, laser/toner, etc. Some of the uses may not be intended for print surfaces, such as certain types of tapes or fasteners. The laminates may be single, double, or multi-ply. Materials used in any of these laminates (other than the adhesive itself) may include films, polymeric films, papers, synthetic paper, synthetic and paper composite materials, silicone or non-silicone release agents, and may be designed for subsequent processing using die cutting, trimming, cutting, slitting, and other converting processes.

The following examples illustrate but do not limit the invention as set forth in the appended claims.

EXAMPLE 1

| Silicone-modified tackifier emulsion | |
|---|---|
| INGREDIENT | % BY WEIGHT |
| Tackifier A | 9.25 |
| Tackifier B | 3.24 |
| Tackifier C | 33.77 |
| Anionic Surfactant | 4.23 |
| Non-ionic Surfactant | 2.08 |
| Reactive Silicone | 6.94 |
| Water | 40.49 |
| | 100.00 |

Tackifier A was Escorez 2520 from Exxon Chemical, an aromatic modified aliphatic resin with a ring and ball softening point of 25° C. and an aromatic content of about 20 wt. %. Tackifier B was Norsolene S115 from Cray Valley, a 100% aromatic resin with a softening point of 115° C. Tackifier C was Wingtack 86 from Cray Valley, an aromatic modified aliphatic resin with a softening point of 85° C. and an aromatic content of about 30 wt. %. The anionic surfactant was potassium rosinate formed by the reaction of rosin (Staybelite from Hercules) with potassium hydroxide as described above. The non-ionic surfactant was an ethoxylated nonyl phenol that contained 10 mol % of ethylene oxide. The reactive silicone was SM 2138 from Momentive Performance Materials, a silanol terminated poly(dimethyl siloxane) polymer having a number average molecular weight of about 35,000 to 45,000.

Tackifiers A, B and C were mixed together and melted above 100° C. (about 120° C.). The melt was cooled to 95° C. and the anionic surfactant, non-ionic surfactant and the reactive silicone were added and it was mixed thoroughly for about 15 minutes. At this stage the reactive silicone reacted with the tackifier, forming silicone-modified tackifier. It is believed that the reactive silicone reacted principally with Tackifier C, which has carbon-carbon double bond reactive sites on aliphatic portions and is present in a higher concentration, and the reactive silicone may have reacted to a small or lesser extent with Tackifier A, which also has carbon-carbon double bond reactive sites on aliphatic portions. It is believed the reaction was via covalent bonding.

The entire mixture was then slowly agitated while hot water (95° C.) was added in increments every 2-3 minutes. Initially, the melt was the continuous phase with droplets of water dispersed throughout the molten material. After about 20% of the total water was added, the mixture underwent phase inversion whereby small particles of the silicone-modified tackifier were dispersed in the continuous water phase. Additional water was then added in increments every 2-3 minutes until the desired % solids was obtained. The resultant product was an emulsion of particles of silicone-modified tackifier in water. The average particle size of the silicone-modified tackifier particles was less than 1 micron. The % total solids of the final emulsion are 59.51%.

EXAMPLE 2

Adhesive A

Pressure Sensitive Adhesive Composition Using Emulsion of Example I

To a blend tank with good agitation, the silicone-modified tackifier emulsion prepared as described in Example 1 was added, allowed to cool to room temperature, and was followed by the acrylic latex, anti-foaming agent and wetting agents in the following amounts.

| INGREDIENT | % BY WEIGHT BASED ON SOLIDS |
|---|---|
| silicone-modified tackifier from Example 1 | 40.75 |
| poly-2-ethylhexyl acrylate latex | 58.38 |
| anti-foaming agent | 0.29 |
| wetting agent 1 | 0.29 |
| wetting agent 2 | 0.29 |

The acrylate polymer in the latex had a number average molecular weight range of 75,000-95,000; the anti-foaming agent was Surfynol DF75 polyglycol ester from Air Products; wetting agent 1 was Dapro W-77 docusate sodium; wetting agent 2 was Surfynol 336 nonionic acetylenic diol from Air Products. All ingredients were blended thoroughly at room temperature, water was added as needed, and the material was then filtered. The final composition had total solids of about 56%. The resultant pressure sensitive adhesive (Adhesive A) was used to coat silicone-coated release liners, which were then laminated to paper stock. The resultant laminate had improved die cutting and guillotine cutting properties.

EXAMPLE 3

Adhesive B

An Adhesive B was made in the same manner as Example 2, with the following ingredients:

| INGREDIENT | % BY WEIGHT BASED ON SOLIDS |
|---|---|
| silicone-modified tackifier from Example 1 | 40.4 |
| poly-2-ethylhexyl acrylate latex | 57.8 |
| anti-foam agent 1 | 0.2 |
| anti-foam agent 2 | 0.4 |
| wetting agent | 1.2 |
| thickener | as needed |
| | 100 |

The ingredients were the same as Example 2, except that anti-foam agent 1 was oil-based, Foamaster 111 from Cognis Corp., anti-foam agent 2 was a poly-glycol ester, Surfynol DF75, and the wetting agent was a docusate sodium, Dapro W-77. The thickener was not used. The final composition had total solids of about 56%. The resultant pressure sensitive adhesive was used to coat silicone-coated release liners, which were then laminated to paper stock. Laminates made using the adhesive showed improved guillotinability and good loop tack and peel adhesion.

COMPARATIVE EXAMPLE 4

Adhesive C

An Adhesive C (the "control") was made as follows with the following ingredients.

| INGREDIENT | % BY WEIGHT BASED ON SOLIDS |
|---|---|
| tackifier | 39.9 |
| poly-2-ethylhexyl acrylate latex | 57.2 |
| anti-foam agent 1 | 0.2 |
| anti-foam agent 2 | 0.4 |
| wetting agent | 1.2 |
| non-reactive silicone oil | 1.1 |
| thickener | as needed |
| | 100 |

The tackifier was a blend of Tackifiers A, B and C of Example 1, in the same relative proportions as Example 1, but without any reactive silicone. The latex, anti-foam agents 1 and 2 and the wetting agent were the same as in Example 3. The non-reactive silicone oil was SM 2163 poly(dimethyl siloxane) from Momentive Performance Materials. The thickener was not needed. At room temperature the tackifier was added to a blend tank with good agitation, followed by the latex, anti-foam agents, wetting agent and non-reactive silicone oil. Then water was added as needed to reach a total solids % of 56%. All ingredients were blended thoroughly at room temperature and then filtered. The resultant pressure sensitive adhesive was used to coat silicone-coated release liners, which were then laminated to paper stock.

EXAMPLE 5

Tack and Adhesion Testing:

Two main attributes of an adhesive in the pressure sensitive laminate market are good guillotine performance and adhesion to a wide variety of substrates. Some substrates are difficult to stick to. Adhesives should have good guillotine performance without sacrificing tack and adhesion. Because a silicone compound, which inherently would be expected to resist adhesion, was added to the adhesives of this disclosure, achieving a comparable level of tack and adhesion of the "control" Adhesive C, while improving guillotinability, is an unexpectedly good result.

The samples listed in the following Table were put through release, tack and adhesion tests. Release, loop tack and peel adhesion tests were conducted according to PSTC (Pressure Sensitive Tape Council) standards. Substrates included corrugated board, stainless steel, glass, polypropylene, high density polyethylene, low density polyethylene, and painted metal.

The following procedure was used for the release test. A two inch wide strip of pressure sensitive laminate was provided. A release tester was used to pull the release liner off the adhesive at a 180 deg. angle at speeds from 12 inches/minute and 300 inches/minute. The force needed to remove the release liner was measured in grams per inch. The higher the number, the more force needed to remove the liner from the adhesive. The following procedure was used for the loop tack test. A one inch wide strip of pressure sensitive adhesive laminate was provided and its release liner was removed. The laminate was looped adhesive side out. A loop tack machine applied a one inch square of the loop to a substrate for one second. The force needed to pull the loop off the substrate was measured in ounces per square inch; the higher the number, the better tack or initial grab the adhesive has on a substrate.

The following procedure was used to carry out a peel adhesion test. A one inch wide strip of pressure sensitive adhesive laminate (liner removed), 7 to 8 inches long was applied to a substrate with an overhang for gripping by the testing machine. The laminate was rolled with a 4.5 pound roller to remove bubbles and to improve contact between the substrate panel and the adhesive backed face sheet. The laminate remained on the substrate for 10 minutes or 24 hours. Then, using an Instron or other peel testing machine, the force needed to pull the adhesive off the substrate (the force being applied perpendicular to the substrate) was measured in ounces/inch; the higher the number, the better the adhesive sticks to the substrate.

The adhesives were tested within two days of coating and then again after aging at room temperature and 120° F. with the release liner on, to simulate a product in a warehouse before use, a product that is in a hot truck in transit, and other harsh practical environments. Aging tests were conducted at 1, 2, 3, and 4 weeks, then again at 3 months, with the adhesive backed face sheet adhered to the substrate for the indicated time period.

Release, Adhesion & Tack Summary for Adhesive A and Adhesive C (Control):

Table 3 is a summary of adhesion and tack results for both Adhesive A and Adhesive C (control) adhesives coated onto face sheets. A laminate construction for all of the adhesives described in this example was: an 80# siliconized paper liner; adhesive coated at 13 lbs/3300 ft$^2$ ream coat weight; and a 60# offset printable paper facesheet. The table shows that the adhesion of Adhesive A was comparable to the control. Both adhesives were also tested on glass and high-density polyethylene; with multiple facesheets, release liners, and adhesive coat weights. The laminate was also aged on panels for extended periods giving similar results for the adhesives. A minimum of three lots of Adhesive A and the control were tested. The lots were coated at different times over a period of about six months.

TABLE 3

| | TEST | | |
|---|---|---|---|
| | time aged on | ADHESIVE | |
| substrate | release liner | Adhesive A | CONTROL |
| release, PSTC 1 standard test method, g/in | | | |
| | Initial | 41.1 | 37.3 |
| | 3 months @ RT | 39.1 | 39.4 |
| | 1 week @ 120 F | 44.5 | 31.9 |
| loop tack, PSTC 16 standard test method, oz/sq in | | | |
| low density polyethylene | Initial | 47.7 | 47.0 |
| | 3 months @ RT | 45.4 | 47.9 |
| | 1 week @ 120 F | 42.4 | 44.0 |
| corrugated | Initial | 27.4 | 36.0 |
| | 3 months @ RT | 30.3 | 29.9 |
| | 1 week @ 120 F | 29.9 | 30.5 |

TABLE 3-continued

| substrate | time aged on release liner | TEST ADHESIVE | |
|---|---|---|---|
| | | Adhesive A | CONTROL |
| stainless steel | Initial | 60.2 | 84.4 |
| | 3 months @ RT | 62.4 | 67.3 |
| | 1 week @ 120 F | 68.7 | 81.4 |
| | peel adhesion, 90°, 10 min dwell, PSTC 1 standard test method, oz/in, peak value | | |
| low density polyethylene | Initial | 48 | 58 |
| | 3 months @ RT | 40 | 48 |
| | 1 week @ 120 F | 19 | 17 |
| corrugated | Initial | 19 | 27 |
| | 3 months @ RT | 17 | 23 |
| | 1 week @ 120 F | 22 | 24 |
| stainless steel | Initial | 39 | 45 |
| | 3 months @ RT | 35 | 41 |
| | 1 week @ 120 F | 39 | 23 |
| | peel adhesion, 90°, 24 hour dwell, PSTC 1 standard test method, oz/in | | |
| low density polyethylene | Initial | 65 | 64 |
| | 3 months @ RT | 55 | 62 |
| | 1 week @ 120 F | 64 | 71 |
| Corrugated | Initial | 33 | 35 |
| | 3 months @ RT | 22 | 29 |
| | 1 week @ 120 F | 27 | 33 |
| stainless steel | Initial | 63 | 66 |
| | 3 months @ RT | 46 | 57 |
| | 1 week @ 120 F | 57 | 68 |

The results of the above tests as shown in Table 3 indicate that Adhesive A has comparable release, loop tack and peel adhesion values as the control adhesive.

Table 4 is a summary of application testing. Practical applications adhesion tests were also conducted on Adhesive B. Adhesive B was tested on various substrates that are difficult to stick to, like police evidence bags, wax coated boxboard, and battery casings. The test consisted of cutting the laminate into the size and shape of a typical label (6"×4"), applying to the substrate, and then removing by hand. Because Adhesive B added a significant amount of silicone compound compared to the control, a goal of the test was for the Adhesive B to achieve adhesion to the difficult-to-adhere substrates that was at least the same or comparable level of adhesion as the control. The adhesion was subjectively rated as poor, average, or good. Adhesive B kept the same adhesion as the control, except on painted metal, and was better on wax corrugated box, polycarbonate, polypropylene, and polyester.

An adhesive-backed face sheet was evaluated relative to a control-backed face sheet on difficult substrates to stick to by manual application and then pulling off the laminate by hand. The results show that Adhesive B is equivalent to the control in bonding difficult substrates in most cases. Adhesive B had a little better adhesion to wax corrugated box, polypropylene, polycarbonate, and polyester relative to the control.

TABLE 4

| Substrate | Adhesive B | Control |
|---|---|---|
| plastic drum | − | − |
| white carton stock | − | − |
| flat corrugated | 0 | 0 |
| corrugated cores | 0 | 0 |
| police evidence bags | − | − |
| Wood | − | − |
| Styrofoam | − | − |
| laser printer | 0 | 0 |
| wax corrugated box | 0 | − |
| cryovac ham | + | + |
| Wood Panels | 0 | 0 |
| Formica countertops | 0 | 0 |
| Stainless Steel | + | + |
| Painted Metal | 0 | + |
| Blood Vials | + | + |
| high density polyethylene bottle | 0 | 0 |
| low density polyethylene | 0 | 0 |
| Battery Casing | + | + |
| Polypropylene | + | 0 |
| Polycarbonate | + | 0 |
| Polyester | + | 0 |
| Kelly paper C11499 corrugated | − | − |
| sock band wrap | + | + |

For applications testing: − is poor adhesion
0 is fair adhesion
+ is good adhesion

EXAMPLE 6

Guillotine Testing:

Many printing companies buy laminate (a laminate of printable paper or film facesheet, PSA adhesive and release liner) in sheet form. Such companies may print on the facesheet and cut the sheets down to a smaller label size. There are various means to cut down the sheet, one being a guillotine press. When using a guillotine, the sheets of laminate are stacked on top of each other and then cut with the guillotine knife blade. In a system like this, the operator stacks the sheets under the guillotine knife, brings a clamp down onto the sheets to hold the sheets in place and then the knife comes down and cuts through the stack.

Because of the clamp pressure, which can be over one ton, and the knife action slicing through the adhesive, there is a tendency for adhesive to ooze at the cut edge of the sheets and stick to the sheets or knife. Over time, the adhesive smears the cut edge of the sheets and is eventually so problematic that either the sheets stick together, or "glue balls" appear on the sheet edge. Glue balls are aesthetically and functionally unacceptable in the label market. Glue balls may become stuck to the laminate and can be an aesthetic issue or transfer off to the print head. Stuck sheets may cause misfeeds through their labeling process or finishing operations where sheets need to slide off one another.

Guillotine operators are skilled at detecting when the stack becomes almost unacceptable, for example, when the edge of the stack is tacky, but sheets are not sticking yet. The operators will stop the press when they notice the problem, and will then clean the knife. When glue balls or adhesive smeared on the cut edges of sheet occurs depends on various factors but with all such factors being equal, depends on the number of cuts made by the guillotine. That is, if only a relatively small number of guillotine cuts are made the problem may not surface whereas with a large number of guillotine cuts the problem is more likely. An adhesive that resists forming stuck sheets or glue balls and is easy to clean from the knife is an advantage to printing companies because they can reduce downtime and scrap in their guillotine operation.

The following tests were conducted at printing companies to test the adhesive of this disclosure with different equipment conditions. Different models of guillotine presses were used. Different guillotine knife compositions were used. For example, the knife itself can be made of different materials, like standard steel, "fast" steel (hardened steel that is longer life and reduces adhesive buildup), tungsten (also reduces buildup), and Teflon coated steel. All knives were ground to a specific bevel and blade bevel degree. Different size stacks were used. Older presses cut smaller stacks (their throat, or distance between the knife and the bed that the stack sits on is smaller); newer presses are able to cut larger stacks because their throat is larger. The guillotining test method was carried out by cleaning the front and back of the knife. The clamp pressure was set. The number of sheets in a stack was counted. A typical sheet size is 17.25"×22.25". The operator cut the sheets at ⅛" or ¼" increments until observing stuck sheets or glue balls. In all cases, the knife contacts the sheet so that the knife cutting edge is perpendicular to the sheet. When cutting sheets of the stack the knife cuts at an angle, which means that the guillotine knife does not come straight down at a 90 degree angle, but comes, for example, from the upper left down to the lower right in most guillotine models tested.

Some guillotine models cut right to left. The significance of this is that the edge of the stack that the knife first slices (the leading edge) consistently has a tendency to build up smeared adhesive or glue balls faster than the rest of the stack.

The following information was recorded: the make and model of the guillotine; the knife information—type of metal, bevel, condition of the knife (freshly sharpened, dull, etc.); the knife direction (knives cut at an angle, from left to right or right to left); the clamp pressure; the stack placement on bed—right, center, or left; the stack size by number of sheets; the number of cuts; the condition of the cut edge of a stack according to a rating scale from 1-6 (one is dry edge; six is glue balls and severe sticking); the height of adhesive residue left on the front and back of the knife according to a rating scale of 1-6 (one is up to ⅛" buildup, 6 is over ⅝" buildup, light or heavy thickness of buildup is also recorded).

The guillotine test was carried out under the conditions described in the following table for the Adhesives A, B and the control (Adhesive C). The adhesives were guillotine cut on three guillotine presses—Adolph Mohr, Saber, and Seybold Citation. The results listed in Table 5 are the summary of a minimum of 30 stacks cut on each press.

TABLE 5

| Adhesive | Guillotine Model | Adolph Mohr 92 MON, 92 EMC-Monitor | Saber | Saber | Saber | Seybold Citation | Seybold Citation |
|---|---|---|---|---|---|---|---|
| | Blade Composition | Fast steel | Fast steel | Fast steel | Fast steel | Fast steel | Fast steel |
| | Blade Bevel | Single | Single | Single | Single | Single | Single |
| | Blade Bevel Degree | 24 deg | 24 deg | 24 deg | 24 deg | 25 deg | 25 deg |
| | Clamp Pressure, lb | 3000 | 3500 | 2000 | 2500 | 1500 | 1500 |
| | Blade cutting direction | Left to right | Left to right | Left to right | Left to right | Right to left | Right to left |
| | Stack placement on bed | Center | Right | Right | Right | Left | Left |
| | Number of sheets in stack | 300 | 500 | 300 | 300 | 300 | 300 |
| Adhesive B | Facesheet | 60# offset | 60# offset | 60# offset | | | 60# offset |
| | Number of cuts | 75+ | 119+ | 219+ | | | 29 |
| | Edge of sheets | 1-2 | 1 | 1 | | | 2-3 |
| | Back of blade | 6 | 6 | 6 | | | 6 |
| | Front of blade | 1 | 2 thick | 1 | | | 1 |
| Adhesive A | Facesheet | 60# offset | | 60# offset | 8 pt tag | 8 pt tag | 60# offset |
| | Number of cuts | 74+ | | 229+ | 195+ | 33 | 94+ |
| | Edge of sheets | 1-2 | | 1 | 1 | 2 | 2-3 |
| | Back of blade | 6 | | 6 | 4 | 6 thick | 6 |
| | Front of blade | 1 | | 1 thick | 1 | 1 | 1 |
| Control | Facesheet | 60# offset | 60# offset | 60# offset | | | 60# offset |
| | Number of cuts | 27 | 39 | 40 | | | 15 |
| | Edge of sheets | 3-4 | 2-3 | 2-3 | | | 2-3 |

TABLE 5-continued

|  |  |  |  |  |
|---|---|---|---|---|
| Back of blade | 6 | 6 | 6 | 6 |
| Front of blade | 1-2 | 2 thick | 1 thick | 1 |

Rating Scale

| Back of blade | Edge of Sheets | Number of cuts |
|---|---|---|
| 1 = 0"-1/8" | 1 = dry | + = no failure |
| 2 = 1/8"-1/4" | 2 = tacky |  |
| 3 = 1/4"-3/8" | 3 = slight legging, sheets starting to stick when fanned |  |
| 4 = 3/8"-1/2" | 4 = legging |  |
| 5 = 1/2"-5/8" | 5 = severe legging |  |
| 6 = >5/8" | 6 = clumps and legging |  |

Laminate was also tested on the following guillotine presses. These were short trials with only one to five stacks cut of each adhesive per trial. The results are shown in the following Table 6.

TABLE 6

| Adhesive | Guillotine Model | Prism | Lawson Pacemaker II | Polar Model 155 EMC | Polar Mohr 92 | Polar Mohr 92 | Polar Mohr 92-43" |
|---|---|---|---|---|---|---|---|
|  | Blade Composition |  |  | Steel | Tungsten | Tungsten | Unknown "standard" |
|  | Blade Bevel | Double bevel |  |  |  |  | Unknown "standard" |
|  | Blade Bevel Degree |  |  | 30 deg |  |  | Unknown "standard" |
|  | Clamp Pressure, lb | 2500 |  | 2500 | 2000 | 3500 | 3000 kg |
|  | Blade cutting direction |  |  |  | Left to right | Left to right | Left to right |
|  | Stack placement on bed |  |  |  | Right | Right | Left-center-right |
|  | Number of sheets in stack | 300 |  | 500 | 150 | 300 | 200 |
| Adhesive B | Facesheet |  |  |  | 60# offset | 60# offset |  |
|  | Number of cuts |  |  |  | 145 | 102 |  |
|  | Edge of sheets |  |  |  | 1-2 | 1-2 |  |
|  | Back of blade |  |  |  | 6 | 5 |  |
|  | Front of blade |  |  |  | 1-2 | 1 |  |
| Adhesive A | Facesheet | 60# offset | 8 pt tag | 60# offset | 60# offset |  | 8 pt tag |
|  | Number of cuts | 39 | 150+ | 35+ | 72 |  | 136+ |
|  | Edge of sheets | Tacky | 1 | 1-2 | 1-2 |  | 1-2 |
|  | Back of blade | 6 | 1 | 5 | 6 |  | 6 |
|  | Front of blade | 4-5 | 1 | 4 | 1 |  | 1-2 |
| Control | Facesheet |  |  |  | 60# offset | 60# offset |  |
|  | Number of cuts |  |  |  | 48 | 22 |  |
|  | Edge of sheets |  |  |  | 1-2 | 1-2 |  |
|  | Back of blade |  |  |  | 6 | 5 |  |
|  | Front of blade |  |  |  | 1-2 | 1-2 |  |

The above results show a substantial improvement in guillotinability was achieved by Adhesives A and B relative to the control adhesive. Both Adhesives A and B exhibited a good ability to be cleaned by the operator. In Tables 5 and 6 the use of a + sign by the number of cuts means no failure of the adhesive backed face sheet. This was due to either running out of stacks to cut or running out of time on the press. The lack of a + sign by the number of cuts means failure of the adhesive backed face sheet. The majority of the time failure was due to adhesive smearing on the edge of the stack. Other failures observed sporadically include glue balls, the top sheet sticking to the knife, buildup of adhesive on the clamp pad or bed, the trim edge sticking between the clamp bed and knife, or what operators refer to as "dishing" when the stack loses its print register.

The terms, "improved guillotinability" or similar terms are defined herein to mean the number of guillotine cuts that are made on a laminate containing the inventive adhesive without failure/the number of cuts that are made on a laminate containing the control adhesive at a point of failure (a point at which the operator stopped the guillotine cutting in anticipation of smeared adhesive or formation of glue balls or other problems). For example, on the Adolph Mohr 92 MON, 92 EMC—Monitor guillotine, the number of cuts made on the laminate that contained Adhesive A was 74+ (no failure) while the number of cuts on the same machine on the laminate that contained the control adhesive was 27 (at a point of failure). Therefore, an Adhesive A laminate exhibited an improved guillotinability of at least a factor of 2. As another example, on the Seybold Citation guillotine, the improvement in guillotinability was at least a factor of 6 for an Adhesive A laminate: 94+ (no failure)/15 (at a point of failure). The improvements and results shown from the use of the invention were surprising and unexpected.

Many modifications and variations will be apparent to those of ordinary skill in the art in light of the foregoing disclosure. Therefore, it is to be understood that, within the scope of the appended claims, the invention can be practiced otherwise than has been specifically shown and described.

What is claimed is:

1. A silicone-modified tackifier, said silicone-modified tackifier being the product of a reactive silicone reacted with a first tackifier.

2. The silicone-modified tackifier of claim 1, wherein said first tackifier is selected from the group consisting of rosin esters, aromatic modified aliphatic resins, aromatic resins, C9 tackifiers, C5/C9 tackifiers, and combinations thereof.

3. The silicone-modified tackifier of claim 1, wherein said first tackifier is selected from the group consisting of (a) products of copolymerizing an aliphatic monomer selected from the group consisting of piperylene, isoprene, dicyclopentadiene, 2-methylbutene and combinations thereof with an aromatic monomer selected from the group consisting of vinyl toluene, styrene, alpha methyl styrene, indene and combinations thereof, (b) products of polymerizing an aromatic monomer selected from the group consisting of vinyl toluene, styrene, alpha methyl styrene, indene and combinations thereof, and (c) combinations of (a) and (b).

4. The silicone-modified tackifier of claim 1, wherein said first tackifier has a ring and ball softening point of 25-110° C.

5. The silicone-modified tackifier of claim 1, wherein said first tackifier has an aromatic content of 5-60 weight percent.

6. The silicone-modified tackifier of claim 1, wherein said reactive silicone is selected from the group consisting of amino-modified silicone oils, epoxy-modified silicone oils, carboxylic acid-modified silicone oils, and silanol-modified silicone oils.

7. The silicone-modified tackifier of claim 1, wherein the ratio in parts by weight of the first tackifier to the reactive silicone is 1.5-20 parts first tackifier to 1 part reactive silicone.

8. The silicone-modified tackifier of claim 1, wherein said silicone-modified tackifier is present in an aqueous emulsion.

9. The silicone-modified tackifier of claim 8, wherein the aqueous emulsion is 10-73 weight percent water.

10. A pressure sensitive adhesive composition comprising, based on solids, 5-90 weight percent of the silicone-modified tackifier according to claim 1.

11. The composition of claim 10, further comprising, based on solids, 9-90 weight percent polymer latex.

12. The composition of claim 11, wherein the silicone-modified tackifier is present in a weight percent, based on solids, of 20-65 and the polymer latex is present in a weight percent, based on solids, of 32-77.

13. The composition of claim 12, wherein the composition has total solids of 30-70 weight percent.

14. The composition of claim 11, wherein said polymer latex is acrylic latex.

15. The composition of claim 14, wherein the acrylic latex is poly-2-ethylhexyl acrylate latex.

16. A laminate comprising a release liner, a face sheet, and a layer of a pressure sensitive adhesive composition according to claim 10 between the face sheet and the release liner.

17. The laminate of claim 16, wherein the face sheet is paper or film.

18. The laminate of claim 17, wherein the pressure sensitive adhesive composition further comprises, based on solids, 9-90 weight percent polymer latex.

19. The laminate of claim 18, wherein the silicone-modified tackifier is present in a weight percent, based on solids, of 20-65 and the polymer latex is present in a weight percent, based on solids, of 32-77.

20. The silicone-modified tackifier of claim 1, wherein the reactive silicone reacts with the first tackifier by covalently bonding with the first tackifier.

21. The silicone-modified tackifier of claim 1, wherein the reactive silicone is a silanol-modified silicone oil.

22. The silicone-modified tackifier of claim 1, wherein the reactive silicone is a silanol-terminated poly(dimethyl siloxane).

23. The silicone-modified tackifier of claim 1, wherein the silicone-modified tackifier is the product of 1-15 parts by weight of the reactive silicone reacted with 25-70 parts by weight of the first tackifier.

24. The silicone-modified tackifier of claim 1, wherein the silicone-modified tackifier is the product of 3-13 parts by weight of the reactive silicone reacted with 33-60 parts by weight of the first tackifier.

25. The silicone-modified tackifier of claim 1, wherein said first tackifier has a ring and ball softening point of 50-90° C.

26. The silicone-modified tackifier of claim 1, wherein said first tackifier has an aromatic content of 10-40 weight percent.

27. The silicone-modified tackifier of claim 1, wherein the first tackifier has carbon-carbon double bond reactive sites on aliphatic portions.

28. The silicone-modified tackifier of claim 1, wherein the first tackifier is an aromatic-modified aliphatic resin or a combination of aromatic-modified aliphatic resins.

* * * * *